United States Patent [19]

Byrne

[11] 4,185,197

[45] Jan. 22, 1980

[54] ARRANGEMENT FOR INHIBITING THE EFFECT OF EXTRANEOUS ELECTRIC FIELDS ON AN IMPROVED IONIZATION SMOKE DETECTOR

[75] Inventor: Michael Byrne, Farranshone, Ireland

[73] Assignee: General Electric Company, New York, N.Y.

[21] Appl. No.: 869,305

[22] Filed: Jan. 13, 1978

[51] Int. Cl.[2] .................................................. G01T 1/18

[52] U.S. Cl. ..................................................... 250/381

[58] Field of Search .................. 250/381, 385; 313/54, 313/313; 174/35 R, 35 TS; 340/629

[56] References Cited

U.S. PATENT DOCUMENTS

| | | | |
|---|---|---|---|
| 3,560,737 | 2/1971 | Skildum | 250/381 X |
| 3,710,110 | 1/1973 | Lampart et al. | 250/381 |
| 4,044,262 | 8/1977 | Minowa | 250/381 |

*Primary Examiner*—Davis L. Willis

*Attorney, Agent, or Firm*—George R. Powers; Carlos Nieves; John F. Cullen

[57] ABSTRACT

An ionization type of smoke detector is described having a means for reducing the effect of extraneous electrical fields which penetrate an ionization chamber of the detector.

12 Claims, 2 Drawing Figures

ARRANGEMENT FOR INHIBITING THE EFFECT OF EXTRANEOUS ELECTRIC FIELDS ON AN IMPROVED IONIZATION SMOKE DETECTOR

BACKGROUND OF THE INVENTION

1. Field of the Invention

This invention relates to smoke detectors. The invention relates more particularly to improvements in smoke detectors of the ionization type.

2. Description of the Prior Art

Ionization type smoke detectors are known and have been used as combustion product detectors in home and in industrial applications for early warning of fire. The ionization detector includes, generally, an ionization chamber having first and second electrodes, a means for establishing an electric field between these electrodes, and means for causing ionization of gaseous particles such as air particles within the chamber. In one form of detector, ionization is produced by exposing the air particles to a radioactive source located within the chamber. Charged particles comprising ions are produced by radiation and an ion current flows between the electrodes.

In an improved form of ionization smoke detector, the ionization chamber is formed by a first cylindrically shaped electrode body having a closure formed at one end thereof and by a printed circuit board and a base member which are positioned at an opposite end thereof. The second electrode comprises a disc shaped body which is supported within the ion chamber by a support means extending from the base body through an aperture in the printed circuit board and into the chamber. Electrical components including an integrated circuit chip and a relatively high reference resistance are also positioned within the chamber. This improved ionization chamber arrangement facilitates manufacture and reduces cost of the detector.

The support means for the second electrode includes a pillar shaped body which is integrally formed with the base member and extends through the circuit board. Since the second electrode is maintained at an electrical potential, the pillar and base members are fabricated of an electrically insulating material.

The smoke detector ionization chamber is a relatively high sensitivity apparatus wherein quiescent ion currents in the picoampere range flow between the first and second electrodes. The detection of combustion products is accomplished by sensing a reduction in the amplitude of the ion current. As indicated, this current is initially of low magnitude and its reduction in amplitude, accompanying the entry of combustion products into the chamber, is also relatively small. Accordingly, relatively high gain electronic detection and amplifying means are utilized with the smoke detector for sensing this variation in ion current amplitude. However, extraneous electric fields can operate to interfere with the proper operation of the detector. It is therefore desirable to shield the chamber and low signal level amplifying components from the interferring extraneous electrical sources which could cause false alarms. In the improved ionization smoke detector referred to above, electronic components which are affected by such extraneous electric influences are positioned within the chamber and the cylindrical electrode shields the chamber and these components from these fields.

It has been found that, at times, the operation of the ionization chamber is interfered with by fields penetrating apertures in the circuit board and which are established by electric charges accumulating on a surface of the detector. The charge accumulation can be, for example, triboelectric. Electric field penetration accompanies the extension of a body through an aperture in the circuit board. These fields, in view of the sensitivity of the ionization chamber and the relatively sensitive electronics utilized therewith, at times interfere with chamber operation and with the associated electronics.

SUMMARY OF THE INVENTION

Accordingly, it is an object of this invention to provide means for inhibiting the effect on a smoke detector ionization chamber of an electric field extending into the chamber.

Another object of the invention is to shield the interior of a smoke detector ionization chamber and electrical components located therein from an electric field extending into the chamber and which is established by charges on a body exterior to the chamber.

A further object of the invention is to shield the interior of a smoke detector ionization chamber from an electric field established by charges on an exterior surface and which extends, along with a support body, into the chamber through apertures in a chamber.

In accordance with features of the present invention, a means is provided for inhibiting the effect of an electrical field which extends with a body through an aperture into a smoke detector ionization chamber. An electrically conductive means having a cross section which is coextensive with or larger than a cross section of the aperture is positioned in the chamber and extends about the body whereby an electric field extending through the aperture terminates on the conductive means.

In accordance with more particular features of the invention, a chamber closure means is positioned at one end of the chamber and includes an aperture and a member having a body extending into the chamber. The electrically conductive means comprises an electrically conductive body which is positioned about the body which extends into the chamber. Means are provided for coupling the conductive body to a reference potential.

In accordance with other features of the invention, the chamber closure means includes a printed circuit board having apertures formed therein and an ion chamber base body. An electrode supoort means which is integrally formed with the base body extends from the body through the apertures in the printed circuit board and into the ionization chamber. Electrical charges accumulating on the base body establish electrical fields which penetrate the apertures and interfere with the operation of the ionization detecter. Tubular shaped electrically conductive bodies are positioned about the support means for shielding the chamber from the penetrating electric field. A means is provided for coupling the tubular body to a reference potential. The invention is particularly advantageous in that it provides a relatively simple, non-complex and relatively low cost arrangement for protecting a smoke detector ionization chamber from the adverse effect of these electric fields.

BRIEF DESCRIPTION OF THE DRAWINGS

These and other objects and features of the invention will become apparent with reference to the following specifications and to the drawings wherein.

DETAILED DESCRIPTION

Figure 1:
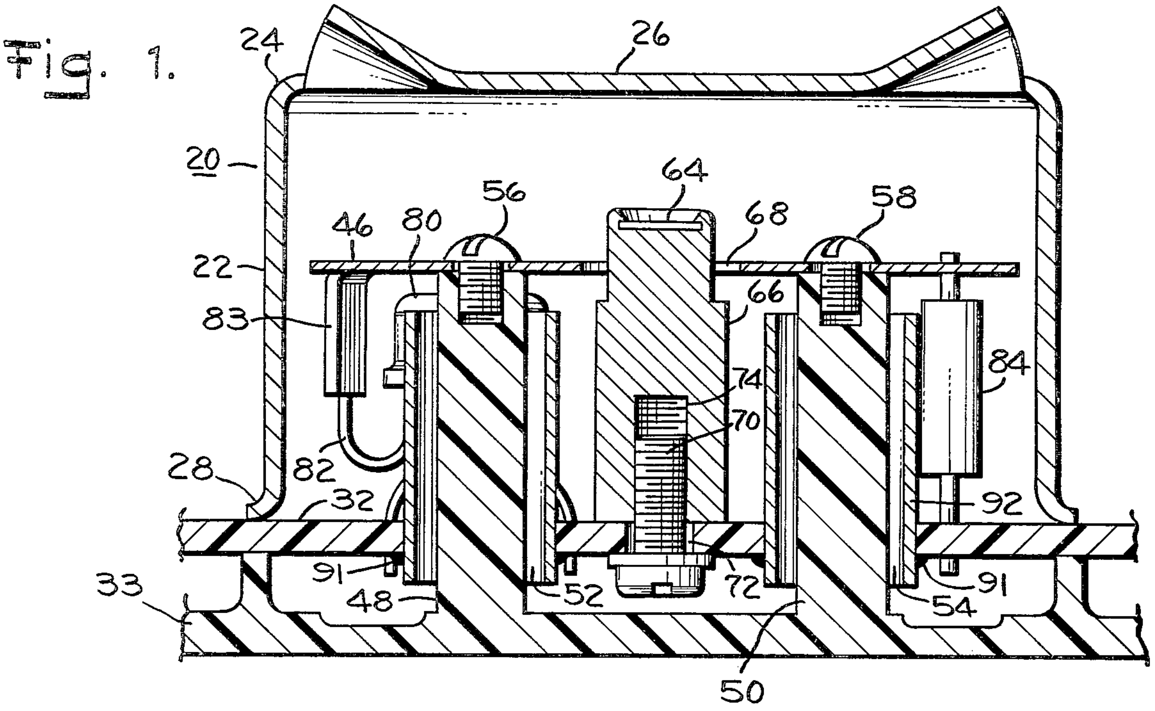
FIG. 1 is a side elevation view, in section, of a smoke detection ionization chamber constructed in accordance with features of this invention; and, FIG. 2 is an exploded, perspective view of the ionization chamber of FIG. 1.

Referring now to the drawing, an ionization chamber 20 for a smoke detector is shown to include a generally cup shaped, metal electrode body 22. An integrally formed chamber closure 26 is located at an end 24 of the body 22. A means of forming a closure at an opposite end 28 of the body 22 is shown to comprise a support base body 30 and a segment of a circuit board 32 which is positioned intermediate the electrode body 22 and the support base body 30. The base body 30, in a preferred arrangement, is formed as an integral segment of a detector housing member 33. The circuit board segment 32 is a well known printed circuit board having printed strip conductors formed thereon. The board includes apertures adapted to receive circuit components for affecting various electrical connections between components of the smoke detector. Electrode body 22 is secured to the base body 30 by screws 34 which extend through apertured tab segments 36 of the electrode body 22, through apertures 38 formed in the printed circuit body 32 and through apertures formed in segments 40 of the base body 30. They engage nuts 42 positioned adjacent a lower surface of the housing member 33. The electrode body 22 is thereby secured in contact with a surface 44 of the printed circuit board segment 32.

A second electrode body 46 is positioned within the ionization chamber 20. The electrode body 46 is supported in the ionization chamber by a first electrically insulative body 48 and a second electrically insulative body 50. The bodies 48 and 50 extend through apertures 52 and 54 which are formed in the printed circuit board segment 32. The bodies 48 and 50 comprise support pillars which are integrally formed with the support body 30 and support the electrode body 46 at a predetermined location within the chamber. Electrode body 46 is secured to the bodies 48 and 50 by screws 56 and 58 respectively which extend through apertures 60 and 62 respectively and engage bores formed in the support bodies. A source 64 of radioactivity for causing ionization within the chamber is provided and comprises, for example, a disc or pellet of AMERICUM 241. The radioactive source 64 is supported within the ionization chamber by a metal support body 66 which extends through an aperture 68 in the electrode body 46. The support body 66 is centrally located within the ionization chamber and is secured to the printed circuit board 32 by a screw 70 which extends through an aperture 72 in the printed circuit board and engages an internally threaded bore 74 in the body 66.

The smoke detector ionization chamber is a relatively sensitive device wherein relatively low amplitude ion currents flow. Since the ionization chamber and relatively low signal detection and amplifying electronic means utilized with the chamber are susceptible to extraneous electric fields, the electrode body 22 provides a shield for the ionization chamber and the relatively low level detection and amplifying electronic means is positioned within the chamber and shielded by the electrode 22. The low level detection and amplifying means is provided by an integrated circuit chip which is supported in a sealed enclosure 80. The chip includes a plurality of electrical leads 82, one of which is conductively coupled to a conductive strap 83 of the electrode 46. The enclosure 80 is supported within the chamber by other leads which are conductively coupled to strips, not illustrated, on the printed circuit board segment 32 in the chamber. An operating potential is applied to the electrode 46 by means of a relatively high impedence reference resistor 84 which is conductively coupled between the electrode 46 and a conductive strip, not illustrated, on the printed circuit board segment 32.

In operation, the radioactive source causes ionization of air particles in the chamber and a quiescent ion current flows between the electrode body 46 and the electrode body 22. Airborne products of combustion which enter the chamber are detected as the ions attach to the particles and reduce the amplitude of the quiescent ion current. This reduction is relatively small and a corresponding voltage variation will occur across the resistor 84. The voltage variation is sensed by the integrated circuit chip and when a predetermined level of voltage variation is attained, an alarm will be sounded.

The use of support bodies 48 and 50, which are integrally formed with the chamber support body 30 of an electrically insulating material, is advantageous in that the manufacture assembly and cost of the smoke detector is enhanced. At times, however, it has been found that static or triboelectric charges accumulating on the support body 30 establish an electric field which extends through the apertures 52 and 54 along with the bodies 48 and 50 respectively into the ionization chamber. This field can interfere with the operation of the sensitive ionization chamber and the detection and amplifying means which are located therein.

Figure 2:
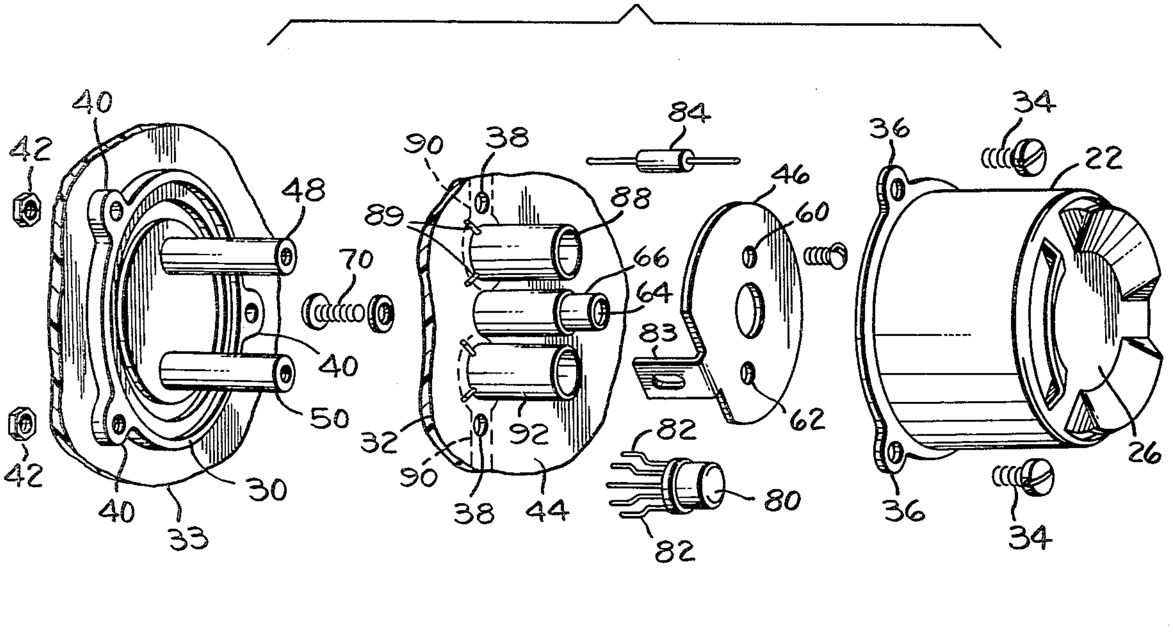

An electrically conductive means is positioned within the chamber and extends about the electrically insulative body 48 for confining the penetrating field. The electrically conductive means comprises, in one embodiment, a tubular shaped conductive body 88 positioned about the support 48. This electrically conductive means has a cross sectional area which is substantially coextensive with or greater than the cross sectional area of the aperture 52. In the illustrated embodiment, the outside diameter of the body 88 is slightly less than the diameter of circular aperture 52 and the body 88 is positioned in the aperture 52. Pins 89 (FIG. 2) are provided for uniting the extension of the body 89 through the aperture 52. Body 88 extends substantially over the length of the body 48. The length of the body 88 need not be coextensive with the length of the body 48. The length is selected for providing that body 88 extend about the body 48 in an axial direction for a distance which inhibits an interfering effect of the penetrating field on the chamber and on the detection and amplifying means. A potentially interfering penetrating field will terminate at the conductive body 88 and is inhibited from interfering with the operation of the ionization chamber and its associated detection and amplifying means.

In a preferred arrangement, the body 88 is a tubular body formed of copper. This electrically conductive means may take other shapes and configurations in accordance with the shape and size of the aperture 52 and the shape and site of the body 48.

A means is provided for maintaining the electrically conductive body 88 at a reference potential. The body 88 is conductively coupled to a conductor strip 90 which is formed on the printed circuit board 32 and by a conductive coupling which is provided by a soldered connection 91. Conductor strip 90 is coupled by circuit means, not shown, to a reference potential such as ground potential.

A conductive body 92 is similarly positioned within the chamber and extends about the body 50 for terminating an electric field which penetrates the aperture 54. The body 92 is similarly conductively coupled to the strip 90 by a solder connection thereby maintaining this body at a reference potential.

A relatively simple, non-complex and relatively low cost means has thus been described for inhibiting the effect of electrical fields which extend through an aperture, along with a body, and into an ionization chamber. The electrical field is confined by electrically conductive means which extend about the body.

While there has been described herein a particular embodiment of the invention, it will be appreciated by those skilled in the art that variations may be made thereto without departing from the spirit of the invention and the scope of the appended claims.

What is claimed is:

1. In an ionization smoke detector having a substantially closed ionization chamber, said chamber having an aperture providing access thereto from outside of said chamber, said aperture having a cross-sectional area, a body extending through said aperture from outside of said chamber into said chamber, the improvement comprising:

electrically conductive means positioned in said chamber and extending about said body, said conductive means having a cross-sectional area which is coextensive with or greater than a cross-sectional area of said aperture whereby an electric field extending through said aperture from outside of said chamber substantially terminates on said conductive body.

2. The ionization detector of claim 1 including means for establishing said electrically conductive means at a reference potential.

3. The ionization chamber of claim 2 including chamber closure means, said closure means having a base member and said body extends from said base member into said chamber.

4. The ionization chamber of claim 3 wherein said body extending into said chamber comprises a support body and said electrically conductive means comprises a conductive body positioned about said support body.

5. The ionization chamber of claim 4 including an electrode positioned within said ionization chamber and said support body supports said electrode within said chamber.

6. An ionization chamber for a smoke detector comprising:

(a) a cylindrically shaped, metal electrode body having a first closure positioned at one end thereof;

(b) means comprising a circuit board and a support base forming a second closure at an opposite end thereof, said circuit board positioned between said support base and said cylindrically shaped body;

(c) an aperture formed in said circuit board;

(d) a body extending from said base through said aperture into said chamber;

(e) an electrically conductive body positioned about said support body within said chamber; and (f) means for coupling said conductive body to a reference potential.

7. The ionization chamber of claim 6 wherein said coupling means comprises a conductor positioned on said circuit board and means for coupling said electrically conductive body to said conductor.

8. The ionization chamber of claim 7 wherein said circuit board includes a second aperture, a second support body extending from said base through said second aperture into said chamber, a second electrically conductive body positioned about said second support body, and means for coupling said second electrically conductive body to said conductor on said circuit board.

9. The ionization chamber of claim 8 including an electrode body positioned in said chamber and said support bodies support said electrode in said chamber.

10. The ionization chamber of claim 7 wherein said conductor positioned on said circuit board comprises a conductive strip formed on said board and said coupling means comprises a conductive connection between said electrically conductive member and said conductive strip.

11. The ionization chamber of claim 7 wherein said electrically conductive body is tubular shaped.

12. The ionization chamber of claim 7 wherein said support body includes a segment thereof having a length extending into said chamber and said electrically conductive body extends about said segment and along substantially the length of said segment.

* * * * *